(12) United States Patent
Suchowski et al.

(10) Patent No.: US 11,009,772 B2
(45) Date of Patent: May 18, 2021

(54) MULTI-FREQUENCY INFRARED IMAGING BASED ON FREQUENCY CONVERSION

(71) Applicant: Ramot at Tel-Aviv University Ltd., Tel-Aviv (IL)

(72) Inventors: Haim Suchowski, Kfar Mordechai (IL); Michael Mrejen, Tel Aviv (IL); Assaf Levanon, Tel Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 0 days.

(21) Appl. No.: 16/499,875

(22) PCT Filed: Apr. 24, 2018

(86) PCT No.: PCT/IL2018/050451
§ 371 (c)(1),
(2) Date: Oct. 1, 2019

(87) PCT Pub. No.: WO2018/198117
PCT Pub. Date: Nov. 1, 2018

(65) Prior Publication Data
US 2020/0110326 A1    Apr. 9, 2020

Related U.S. Application Data

(60) Provisional application No. 62/488,929, filed on Apr. 24, 2017.

(51) Int. Cl.
*H04N 5/33*    (2006.01)
*G02F 1/35*    (2006.01)
*G02F 2/02*    (2006.01)

(52) U.S. Cl.
CPC .......... *G02F 1/3534* (2013.01); *G02F 1/3526* (2013.01); *H04N 5/33* (2013.01)

(58) Field of Classification Search
CPC ...... G02F 1/3534; G02F 1/3526; G06F 3/011; H04N 5/33
(Continued)

(56) References Cited

U.S. PATENT DOCUMENTS

| 4,369,363 A | * | 1/1983 | Quint | ................... G02F 1/3526 250/214.1 |
| 5,768,302 A | | 6/1998 | Wallace et al. | |

(Continued)

FOREIGN PATENT DOCUMENTS

| CN | 107563971 | 1/2018 |
| KR | 10-2014-0077620 | 6/2014 |

(Continued)

OTHER PUBLICATIONS

International Preliminary Report on Patentability dated Nov. 7, 2019 From the International Bureau of WIPO Re. Application No. PCT/IL2018/050451. (7 Pages).

(Continued)

*Primary Examiner* — Robert Chevalier

(57) ABSTRACT

An imaging system comprises a light source generating a pump beam, and an optical coupling system for receiving an input beam of infrared light from a scene and combining the input beam with the pump beam, wherein an intensity of the pump beam is higher than an intensity of the input beam. The imaging system further comprises a crystal configured for adiabatically mixing the beams and providing an output beam having a frequency which is a sum of frequencies of the input and pump beams, and a visible, near-infrared or ultraviolet light imager configured for collecting and to spectrally resolving the output beam.

21 Claims, 4 Drawing Sheets

(58) Field of Classification Search
USPC .................................. 348/164; 359/328, 330
See application file for complete search history.

(56) References Cited

U.S. PATENT DOCUMENTS

| | | | |
|---|---|---|---|
| 6,028,323 | A | 2/2000 | Liu |
| 6,687,051 | B1 | 2/2004 | Wang et al. |
| 8,331,017 | B2 | 12/2012 | Suchowski et al. |
| 2004/0095634 | A1* | 5/2004 | Paschotta .............. H01S 3/1083 359/330 |
| 2010/0039699 | A1 | 2/2010 | Asobe et al. |
| 2010/0220384 | A1 | 9/2010 | Kimura et al. |
| 2011/0026103 | A1* | 2/2011 | Suchowski ........... G02F 1/3558 359/326 |
| 2011/0043895 | A1 | 2/2011 | Hikmet |
| 2017/0273567 | A1 | 9/2017 | Fengler et al. |
| 2018/0052057 | A1 | 2/2018 | Richards et al. |

FOREIGN PATENT DOCUMENTS

| | | |
|---|---|---|
| WO | WO 2014/033465 | 3/2014 |
| WO | WO 2017/201093 | 11/2017 |
| WO | WO 2018/198117 | 11/2018 |

OTHER PUBLICATIONS

International Search Report and the Written Opinion dated Aug. 6, 2018 From the International Searching Authority Re. Application No. PCT/IL2018/050451. (11 Pages).
Cankaya et al. "Highly Efficient Broadband Sum-Frequency Generation in the Visible Wavelength Range", Optics Letters, 39(10): 2912-2915, Published Online May 8, 2014.
Dam et al. "Room-Temperature Mid Infrared Single-Photon Spectral Imaging", Nature Photonics, 6(11): 788-793, Published Online Sep. 16, 2012.
Moses et al. "Fully Efficient Adiabatic Frequency Conversion of Broadband Ti:Sapphire Oscillator Pulses", Optics Letters, 37(9): 1589-1591, May 1, 2010.
Suchowski et al. "Adiabatic Frequency Conversion of Ultrafast Pulses", Applied Physics B: Lasers and Optics, 105(4): 697-702, Published Online Jun. 3, 2011.
Suchowski et al. "Adiabatic Processes in Frequency Conversion", Laser & Photonics Reviews, 8(3): 333-367, May 2014.
Suchowski et al. "Geometrical Representation of Sum Frequency Generation and Adiabatic Frequency Conversion", Physical Review A, 78(6): 063821-1-073821-5, Dec. 15, 2008.
Suchowski et al. "Octave-Spanning Coherent Mid-IR Generation Via Adiabatic Difference Frequency Conversion", Optics Express, 21(23): 28892-28901, Published Online Nov. 15, 2013.
Suchowski et al. "Robust Adiabatic Sum Frequency Conversion", Optics Express, 17(15): 12731-12740, Published Online Jul. 13, 2009.
Supplementary European Search Report and the European Search Opinion dated Dec. 14, 2020 From the European Patent Office Re. Application No. 18790570.8. (8 Pages).

* cited by examiner

MULTI-FREQUENCY INFRARED IMAGING BASED ON FREQUENCY CONVERSION

RELATED APPLICATION

This application is a National Phase of PCT Patent Application No. PCT/IL2018/050451 having International filing date of Apr. 24, 2018 which claims the benefit of priority of U.S. Provisional Patent Application No. 62/488,929 filed on Apr. 24, 2017. The contents of the above applications are all incorporated by reference as if fully set forth herein in their entirety.

FIELD AND BACKGROUND OF THE INVENTION

The present invention, in some embodiments thereof, relates to imaging and, more particularly, but not exclusively, to a method and a system for infrared imaging.

Imaging of infrared radiation may in general be considered as advantageous, since infrared radiation may carry information which is not obtainable by merely obtaining the images from other types of optical radiation, e.g., the visible radiation.

U.S. Pat. No. 6,687,051 describes an image apparatus for converting infrared light into visible light. The apparatus includes an object lens with an optical crystal and an infrared object lens. The object lens converts an infrared light spectrum image into a visible light spectrum image.

U.S. Pat. No. 8,331,017 describes a quasi-phase matched non-linear crystal for wavelength conversion. The crystal has an aperiodic poled structure, where each period is tuned in a manner that the tuning varies adiabatically along a length of the crystal from a strong negative mismatch at one end of the crystal to a strong positive mismatch at another end of the crystal.

Dam et al., Nature Photonics 6, 788-793 (2012), discloses an upconversion system for two-dimensional, mid-infrared spectral imaging. Mid-infrared light is upconverted in a single pass through a nonlinear crystal that mixes the mid-infrared light with a laser beam, to generate the upconverted light at near-visible wavelengths. The phase-match condition of the nonlinear crystal is varied, and images are individually acquired for each phase-match condition, to obtain a set of images, each containing light from only one specific narrow band of wavelengths. Image reconstruction is then employed to piece together the set of individually acquired images. The bandwidth of the upconversion system varies with the phase-matched wavelength, and reaches a maximum of 200 nm at 4.2 mm, beyond which it decreases.

Additional background art includes Suchowski et al., "Geometrical representation of sum frequency generation and adiabatic frequency conversion", Physical Review A 78, 063821 (2008); Suchowski et al., Opt. Exp 17, 12732 (2009); Suchowski et al., "Adiabatic frequency conversion of ultrafast pulses", Applied Physics B 105, 697 (2011); Suchowski et al., "Adiabatic processes in frequency conversion", Laser and Photonics Reviews 8, 333 (2014); Suchowski et al., "Octave-spanning coherent mid-IR pulses via adiabatic difference frequency generation", Opt. Exp. 21, 28892 (2013); and Cankaya et al., "Highly efficient broadband sum-frequency generation in visible wavelength range", Opt. Lett. 39, 2912 (2014); Moses et al., Opt. Lett. 37, 1589 (2012).

SUMMARY OF THE INVENTION

According to an aspect of some embodiments of the present invention there is provided an imaging system. The imaging system comprises: a light source generating a pump beam; an optical coupling system configured for receiving an input beam of infrared light from a scene and combining the input beam with the pump beam, wherein an intensity of the pump beam is higher than an intensity of the input beam. The imaging system further comprises a crystal configured for adiabatically mixing the beams and providing an output beam having a frequency which is a sum of frequencies of the input and pump beams, and a visible, near-infrared or ultraviolet light imager configured for collecting and for spectrally resolving the output beam.

According to some embodiments of the invention the output beam is a visible light output beam.

According to some embodiments of the invention the crystal is optimized such that an extent of Kerr effect and/or two-photon absorption due to interaction of the light beams with the crystal is less than a predetermined threshold.

According to some embodiments of the invention the light source is configured for generating a pulsed pump beam at a repetition rate, and the system comprises a cavity, characterized by a resonance frequency within a bandwidth of the pump beam, and having a length selected based on the repetition rate to synchronize between pulses in the pump beam.

According to some embodiments of the invention the light source is configured for generating a continuous wave pump beam.

According to some embodiments of the invention the crystal configured for simultaneously mixing the pump beam with each of a plurality of wavelengths of the input beam.

According to some embodiments of the invention the plurality of wavelengths of the input beam spans over at least one octave.

According to some embodiments of the invention the plurality of wavelengths span over at least 10% of a range of wavelengths defined from about 1.5 μm to about 20 μm.

According to some embodiments of the invention the light source is configured for generating a pulsed pump beam and wherein a characteristic pulse duration of the pulsed pump beam is less than 10 ns.

According to some embodiments of the invention the crystal configured for adiabatically mixing mid-infrared light with near-infrared light.

According to some embodiments of the invention the system comprises at least two crystals, a beam splitter system and a beam combiner system. In these embodiments, the beam splitter system is configured to split the input beam to at least two secondary input light beams and direct each secondary input light beam to a different crystal of the at least two crystals, wherein each crystal of the at least two crystals is configured for adiabatically mixing a respective secondary input light beam with the pump beam and providing an individual respective output beam having a frequency which is a sum of frequencies of the secondary input and pump beams, and wherein the beam combiner system is configured to combine the individual output beams to provide the output beam.

According to an aspect of some embodiments of the present invention there is provided a method of imaging. The method comprises: receiving an input beam of infrared light from a scene; combining the input beam with a pump beam, wherein an intensity of the pump beam is higher than an intensity of the input beam; transmitting the beams to a crystal configured for adiabatically mixing the beams to provide a visible or near-infrared light output beam having a frequency which is a sum of frequencies of the input and pump beams; and collecting the output beam using a visible, near-infrared or ultraviolet light imager configured for collecting and to spectrally resolving the output beam.

According to some embodiments of the invention an intensity of the pump beam is selected such that an extent of Kerr effect due to interaction of the light beams with the crystal is less than a predetermined threshold.

According to some embodiments of the invention an intensity of the pump beam is selected such that an extent of two-photon absorption due to interaction of the light beams with the crystal is less than a predetermined threshold.

According to some embodiments of the invention the pump beam is a pulsed pump beam, and the method comprises enhancing a mixing power of the beams in the crystal using a cavity characterized by a resonance frequency within a bandwidth of the pump beam, and having a length selected based on the repetition rate to synchronize between pulses in the pump beam.

According to some embodiments of the invention a characteristic pulse duration of the pulsed pump beam is less than 10 ns.

According to some embodiments of the invention a lateral area of the crystal is at least 5 mm by 5 mm.

According to some embodiments of the invention the input beam is a mid-infrared beam, and the pump beam is a near-infrared beam.

According to some embodiments of the invention the input beam spans over at least one octave.

According to some embodiments of the invention the input beam comprises a plurality of wavelengths spanning over at least 10% of a range of wavelengths defined from about 1.5 µm to about 20 µm.

According to some embodiments of the invention the receiving, the combining, the transmitting and the collecting are executed at a single shot without combining image information from a plurality of image acquisitions.

According to some embodiments of the invention the input beam is coherent.

According to some embodiments of the invention the input beam is incoherent.

According to some embodiments of the invention the imager comprises silicon.

According to some embodiments of the invention the imager comprises a MOS circuit or a CMOS circuit.

According to some embodiments of the invention the imager comprises a CMOS imager.

According to some embodiments of the invention the scene comprises a sample on a microscope slide.

According to some embodiments of the invention the scene is an outdoor scene.

According to some embodiments of the invention the scene is an aerial photography.

According to some embodiments of the invention the scene is an astronomical scene.

According to some embodiments of the invention the scene is a living body or an organ thereof.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
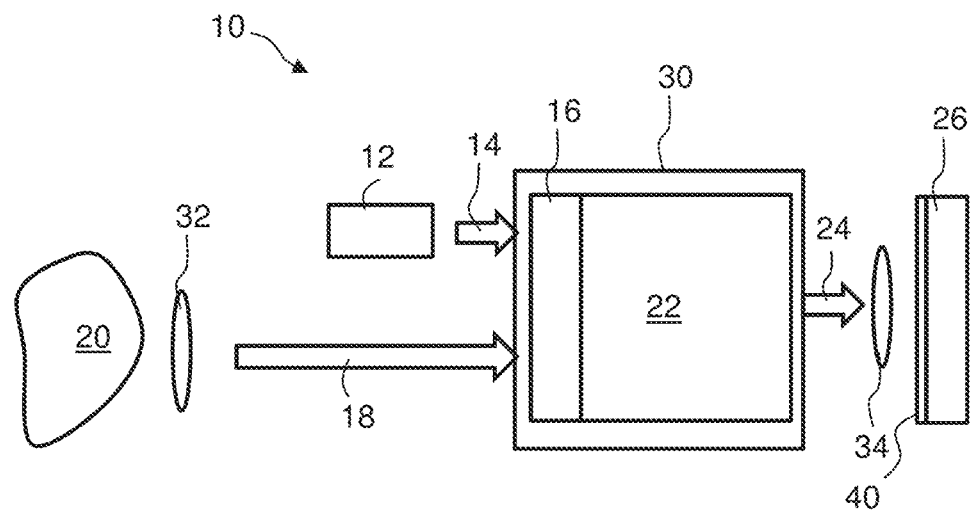
FIGS. 1A and 1B are schematic illustrations of an imaging system, according to some embodiments of the present invention.

The present invention, in some embodiments thereof, relates to imaging and, more particularly, but not exclusively, to a method and a system for infrared imaging.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The mid-infrared (mid-IR) wavelength regime, spanning the wavelength range of 2-15 μm (750-5,000 cm$^{-1}$), is of particular importance to materials science, chemistry, biology and condensed matter physics, as it covers the fundamental vibrational absorption bands of many gaseous molecules and bio-molecules, thus of tremendous scientific and technological interest. As the characteristic vibrational transitions have line strengths that are several order of magnitude stronger that the near-infrared region, those provide a unique information on a sample's molecular composition, thus the mid-IR is also called the fingerprint region. Moreover, as the mid-IR spectral region contains two atmospheric transmission windows (3-5 μm and 8-13 μm), in which the Earth's atmosphere is relatively transparent, it makes mid-IR laser sources useful for many applications including, without limitation, atmospheric, defense and industrial applications. In addition, imaging in the IR can be useful for thermal analysis, security and materials inspection.

Several types of infrared imaging systems are known. One such type includes infrared cameras which are based on the photo-electric effect. Known infrared cameras include mid-wave IR (MWIR) cameras, long-wave IR (LWIR) cameras and short-wave IR (SWIR) cameras. The choice of materials that compose the detectors makes the various systems operate under different circumstances. Compared to visible and the lower range of near-infrared detectors, which are based mainly on Silicon, the mid-infrared detectors are based on indium antimonide (InSb), and/or Mercury Cadmium Telluride (MCT) making them expensive, low resolution, suffering from poor sensitivity and slow response.

In the mid-infrared, a single detector scanning systems or line scanning systems are conventionally used. This requires very accurate mechanical alignment as well as synchronization algorithms. Two-dimensional array detectors are also being used, yet those still have very small number of pixels (hundreds in each axis) and thus have very low spatial resolution compared to the current state of the art in Silicon-based cameras (thousands of pixels in each axis). The detector of a MWIR camera absorbs all the photons that are above the bandgap and therefore the main problem of thermal imaging is that during the detection process, the spectral components are integrated and cannot be later retrieved.

Known are spectral mid-IR imaging techniques that are carried out by using a discrete set of bandpass filters, each allowing the transmission of a narrow window of infrared radiation. However this technique is slow, since it requires the sequential acquisition of images for each filter and requires a significant signal to noise ratio at each spectral window, making it a very low sensitivity technique.

In a search for an improved spectrally resolved imaging in the infrared spectral region the Inventors found that a processes known as adiabatic sum frequency conversion, can be used to convert broadband infrared images into the visible and/or near-infrared spectral range and therefore allow high resolution, color imaging of broad spectra information using low-cost, high sensitivity and robust visible CCD.

Figure 1B:
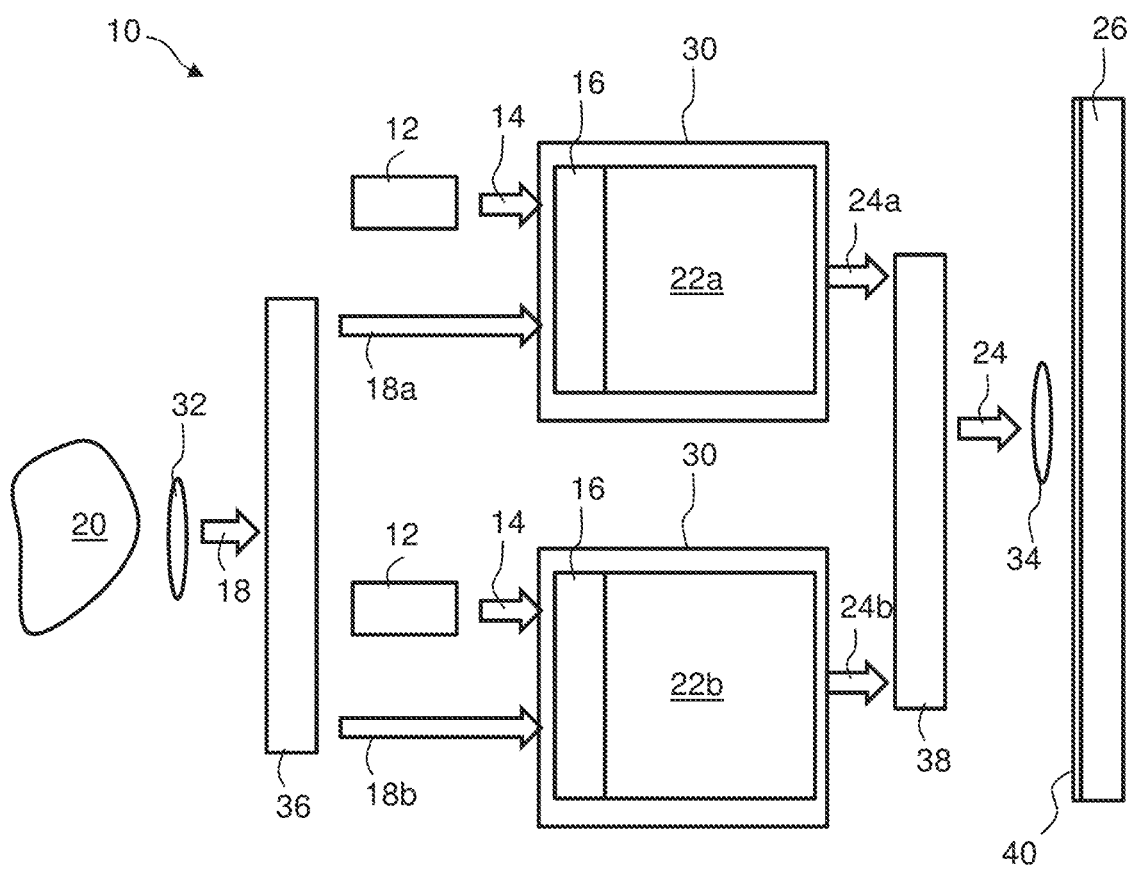

Referring now to the drawings, FIGS. 1A and 1B are schematic illustrations of an imaging system 10, according to some embodiments of the present invention. System 10 comprises a light source 12 generating a pump beam 14, and an optical coupling system 16. Optical coupling system 16 receives a coherent or incoherent input beam 18 of infrared light from a scene 20, optionally and preferably via a lens system 32, and combines the input beam 18 with the pump beam 14. In various exemplary embodiments of the invention the intensity of pump beam 14 is higher than the intensity of input beam 18. Optical coupling system 16 can include any optical coupler known in the art that can in-couple two or more light beams. For example, coupling system 16 can be a lens or lens array, a diffractive element, a fiber optic coupler, a dichroic mirror and the like.

The pump beam 14 is optionally and preferably characterized by a wavelength range having a central wavelength that is shorter than the central wavelength that is characteristic to the input beam 18. In some embodiments of the present invention the longest wavelength of the pump beam 14 is shorter than the shortest wavelength of the input beam 18. As a representative example, the input beam 18 can be a mid-infrared beam (e.g., having a plurality of wavelength within the range of 3 μm to 8 μm, inclusive), and the pump beam 14 can be a near-infrared beam (e.g., having at least one wavelength within the range of 0.7 μm to 1.5 μm, inclusive). Other wavelengths for beams 14 and 18 are also contemplated.

In some embodiments of the present invention light source 12 generates a pulsed pump beam at a repetition rate. System 10 can optionally and preferably comprise a cavity 30 characterized by a resonance frequency within a bandwidth of pump beam 14, and having a length selected based on the repetition rate of the pulsed pump beam to synchronize between pulses in the pump beam 14. When light source 12 generates a pulsed pump beam, the characteristic pulse duration of the generated pulsed pump beam is less than 10 ns or less than 9 ns or less than 8 ns or less than 7 ns or less than 6 ns or less than 5 ns or less than 4 ns or less than 2 ns or less than 1 ns or less than 0.1 ns. The advantage of having a cavity is that it can allow very short pulses for the pump beam and reduce the exposure time that is required for imaging. The cavity allows effectively reaching high pump intensity density, and therefore can also be used for frequency conversion with continuous wave pump beam (e.g., 100 W or more).

System 10 optionally and preferably comprises a crystal 22 that receives beams 14 and 18 from coupling system 16 and adiabatically mixes these beams to provide an output beam 24 having a frequency which is a sum of frequencies of input beam 18 and pump beam 14. Optionally and preferably output beam 24 is a visible light beam (e.g., having a plurality of wavelength within the range of 400 nm to 800 nm, inclusive). Alternatively, output beam 24 can be a near-infrared light beam (e.g., having a plurality of wavelength within the range of 0.7 μm to 1.5 μm, inclusive). In embodiments in which system 10 comprises cavity 30, the cavity serves for enhancing the mixing power of beams 14 and 18 in crystal 22.

In various exemplary embodiments of the invention crystal 22 is configured for simultaneously mixing pump beam 14 with each of a plurality of wavelengths of input beam 18. The wavelengths of input beam 18 that are mixed by crystal 22 with pump beam 14 optionally and preferably spans over a wide wavelength band, e.g., over one, two, three or more octaves. In some embodiments of the present invention the wavelengths of input beam 18 that are mixed by crystal 22 with pump beam 14 span over at least 10% or at least 15% or at least 20% or at least 30% or at least 40% or at least 50% or at least 60% or at least 70% or at least 80% or at least 90% of a range of wavelengths defined from about 1.5 μm to about 20 μm.

The lateral area of crystal 22 is optionally and preferably sufficiently large to allow crystal 22 to receives light rays from all or at least most of the objects or portions of objects in scene 20. According to some embodiments of the invention, a lateral area of the crystal is selected according to a predetermined Point Spread Function (PSF). The PSF relates to the intensity distribution $I_{pump}(x,y)$ of the pump beam 14 in the transverse plane x-y, via the Fourier transform or fast Fourier transform:

$$PSF=FFT\{I_{pump}(x,y)\}$$

Typically, the lateral area of crystal 22 is at least 5 mm by 5 mm, or at least 10 mm by 10 mm or at least 15 mm by 15 mm. For example, for a 5 μm pixel size of a ⅓ inch imager, the lateral area of the crystal can be about 1 mm² for every 100 pixels of the imager. In these embodiments, a 5 megapixel image (2560×1920 pixels) can be achieved using a crystal having lateral dimensions of about 25.6 mm by 19.2 mm The principles and operations of crystal 22 will now be explained.

Crystal 22 achieves efficient broadband frequency conversion using sufficiently strong pump intensity relative to the intensity of the input beam (e.g., at least two times or at least five times or at least ten times stronger) and by providing the light beams with gradually changing conditions (e.g., gradual change in the phase mismatch). The gradually changing conditions effect a gradual conversion of beam 18's frequency as it propagates in crystal 22. During the conversion process each original frequency component of beam 18 is converted to a converted frequency in the near-infrared or visible or ultraviolet range. The conversion is gradual in the sense that as the beam propagates in crystal 22 the intensity of each original frequency component is gradually decreased, and the intensity of each converted frequency component is gradually increased.

Gradually changing conditions can be accomplished in more than one way.

In some embodiments of the invention crystal 22 has a periodic or aperiodic structure, and is under a temperature gradient. For example, crystal 22 can be in thermal contact with a heating or cooling source (not shown) that applies a thermal gradient along the propagation direction of beams 14 and 18 in crystal 22. In these embodiments, the beams are exposed to a gradual change of the temperature during their propagation, thereby achieving the aforementioned gradual frequency conversion.

In some embodiments of the invention crystal 22 has a Quasi-phase matching (QPM) structure with adiabatic aperiodic poling.

Quasi-phase matching (QPM) with adiabatic aperiodically poled designs is an efficient crystal structure for achieving adiabatic changes since the structure has periods which can be modified to range over a series of phase mismatches from a negative to a positive mismatch for increasing or decreasing the frequency. Modifying the crystal structure from positive to negative mismatch according to some embodiments of the present invention achieves the desired conversion.

The present embodiments modify the QPM crystal structure through a gradual change in the tuning characteristics along the crystal. The result is efficient frequency conversion over a broad frequency range. A particular advantage of crystal 22 is that it can achieve both efficiency and broadband. Typically, crystal 22 is works in a regime where a strong narrow-band pump (beam 14 in the present embodiments) is introduced into the crystal, along with a weaker broadband beam (beam 18 in the present embodiments) which is to be converted.

In contrast with conventional requirement of perfect phase matching along the crystal, crystal 22 provides continuous adiabatic variation of phase mismatch. Crystal 22 has a length dimension z and tuning conditions along the z dimension of the crystal optionally and preferably vary from negative to positive. That is to say, crystal 22 is a quasi-phase matched non-linear crystal, having a longitudinal dimension and having a periodic pole structure comprising a plurality of tuned periods. Tuning of the respective periods varies adiabatically, meaning gradually, along the longitudinal dimension of the crystal.

Herein, the term "adiabatic" or "adiabatically" takes its meaning from quantum physics, and refers to the ability of the crystal to set up a quantum mechanical system with the light beams, in which the crystal structure presents to the light beams gradually changing conditions, allowing the system to change its functional form. That is to say, an adiabatic change comprises a change that is sufficiently gradual as to retain an eigenstate of the optical system. This is in contrast with conventional crystals that provide rapidly varying conditions in which there was no time for the functional form of the state (of the quantum mechanical system) to adapt, so that the system remained in its original state. The gradual change in conditions allows the quantum dynamic state to remain stable and respond to the changing conditions. Rapid change by contrast gets ignored.

The phase mismatch, $\Delta k(z)$ optionally and preferably changes adiabatically from a big negative value, or vice versa, as an analogy to the way in which a red detuned field interacts with a two level system, to a big positive value, as an analogy to the blue detuned field.

For a wave process to be considered adiabatic, the magnitude value of the phase mismatch parameter $\Delta k$, in absolute value, is preferably large (e.g., at least 10 times larger) in comparison to the value of the coupling coefficient κ. Additionally $\Delta k$ optionally and preferably starts with a negative (or positive) value, and ends with a positive (or negative) value. Further, the rate of change of $\Delta k$ is smaller (e.g., at least 10 times smaller) than the internal propagation length of the nonlinear process which can be formally written as $(\Delta k^2+\kappa^2)^{3/2}/\kappa$.

QPM is a technique in nonlinear optics which allows a transfer of energy from pump frequency to signal and idler frequencies. It offers several advantages over other phase matching techniques, such as the fact that all optical frequencies involved are collinear with each other and all the optical frequencies can have the same polarization, which allows for the access to the largest nonlinear coefficient of the crystal, $d_{33}$. The value of the phase mismatching achieved by the quasi phase matching technique is optionally and preferably $\Delta k_A(z)=2\pi/\Lambda(z)$, where $\Lambda(z)$ is the width of crystal 22's period at position z.

The periods and phase mismatch of crystal 22 are preferably selected in accordance with the expected wavelengths of the beams 14 and 18. In various exemplary embodiments of the invention crystal 22 is designed and constructed for adiabatically mixing mid-infrared light with near-infrared light.

Crystal 22 can be made of any material that is transparent to the input beam 18. Representative examples include, without limitation lithium niobate, KTP, cadmium silicon phosphide (CdSiP2), orientation-patterned gallium arsenide (OP-GaAs), and orientation-patterned gallium phosphide (OP-GaP).

Referring again to FIGS. 1A-B, system 10 optionally and preferably comprises a visible, near-infrared or ultraviolet light imager 26 that collects output beam 24, optionally and preferably via an additional lens system 34, and spectrally resolves output beam 24. Imager 26 can be of any type known in the art, that is capable of spectrally resolving light. For example, imager 26 can be a silicon based imager, such as, but not limited to, an imager that comprises a MOS circuit or a CMOS circuit. In some embodiments of the present invention imager 26 comprises a CMOS imager. It is expected that during the life of a patent maturing from this application many relevant spectral resolving devices will be developed and the scope of the term imagers is intended to include all such new technologies a priori.

In some embodiments of the present invention crystal 22 is optimized such that an extent of Kerr effect and/or two-photon absorption due to interaction of light beams 14 and 18 with crystal 22 is less than a predetermined threshold (e.g., less than 20% or 10% or less than 5% of the image generated by system 10 is deformed due to the Kerr effect). This can be ensured by collecting light beam from a calibrating scene and measuring the frequency conversion efficiency at each of a plurality of locations on a cross-section of the output beam 24 (e.g., at each of at least a portion of the pixels of imager 26). The parameters of crystal 22 (for example, the periods or temperature gradient) can then be varied or adjusted until the conversion efficiency is substantially uniform (e.g., with deviation of less than 10%) across the output beam.

In some embodiments of the present invention system 10 comprises more than one crystal for the adiabatic mixing (see FIG. 1B). These embodiments are useful, for example, for increasing the bandwidth over which system 10 can operate. For example, one crystal can be selected for frequency conversion of a first sub-bandwidth and another crystal can be selected for frequency conversion of a second sub-bandwidth, wherein the combination (e.g., concatenation) of all the sub-bandwidths results in the desired bandwidth. When more than one crystal 22 is employed, system 10 optionally and preferably comprises a beam splitter system 36 that splits beam 18 into two or more secondary beams 18a and 18b. Each of the secondary beams is then directed to a separate crystal 22a and 22b for frequency conversion as further detailed hereinabove, to provide two or more output beams 24a and 24b. The individual output beams 24a and 24b are then combined by a beam combiner system 38 to one output beam 24 that is collected by the imager 26 as further detailed hereinabove.

Each of the crystals 22a and 22b can be pumped by a separate pump beam, as illustrated in FIG. 1B, or the same pump beam can be used with two or more of the crystals. In the latter embodiment, the pump beam 14 from light source 12 can be split, for example, by a beam splitter system (not shown) to two or more secondary pump beams, each directed to a separate crystal. Alternatively, pump beam 14 can be fed serially, e.g., by means of suitable optics (not shown), through two or more of the crystals.

While FIG. 1B illustrates an embodiment in which system 10 comprises two crystals 22a and 22b, this need not necessarily be the case, since more than two crystals can be employed. One of ordinary skills in the art, provided with the details described herein would know how to construct a system with any number of crystals.

Beam splitter system 36 can be of any type suitable to receive a light beam and output two or more light beams. In the simplest configuration, beam splitter system 36 comprises a tilted semi-transparent reflector, but other types of beam splitter systems, such as, but not limited to, beam splitter systems employing fiber optics, are also contemplated. Similarly, beam combiner system 38 can be of any type suitable to receive two or more light beams and output one light beam. In the simplest configuration, beam combiner system 38 comprises a tilted semi-transparent reflector, but other types of beam combiner systems, such as, but not limited to, beam combiner systems employing fiber optics, are also contemplated.

In some embodiments of the present invention system 10 comprises an optical filter 40 selected to filter out the frequency or frequencies of pump beam 14 so as not to contaminate the imager with pump frequencies. Filter 40 can be positioned anywhere along the optical path of output beam 24, such as, but not limited to, at the output side of crystal 22 or at the input side of imager 26.

In use of system 10, input beam 18 is received of infrared light from a scene, and is combined with a pulsed pump beam, which is typically higher in intensity than the input beam. The beams are then transmitted to a crystal that adiabatically mixes the beams to provide an output beam having a frequency which is a sum of frequencies of the input and pump beams. The output beam is preferably a visible or near-infrared light beam, as further detailed hereinabove. The output beam is collected using a light imager that spectrally resolves the output beam.

In some embodiments of the present invention system 10 is used for single shot imaging, without combining image information from several image acquisitions. In this embodiment, the entire image information of the scene to be imaged is captured once by the input beam without the need to collect the input beam several times. This is in distinction from conventional upconversion imaging techniques in which a set of images is acquired, wherein each contains light from a specific narrow band of wavelengths, and image reconstruction techniques are then employed to piece the images together.

The technique of the present embodiments enjoys several advantages over conventional technique. Unlike conventional infrared imaging, the technique of the present embodiments leads to spectrally resolved imaging of scenes constituted by mid-IR beams where each wavelength in the mid-IR is uniquely mapped to a color in the imager. This means that the technique of the present embodiments allows, for example, remote detection of gaseous composition of dust clouds and more. Additionally, the quantum efficiency (and hence the sensitivity) is expected to be significantly boosted since the quantum efficiency scales linearly with the mixing power.

System 10 can be used for imaging many types of scenes. For example, in some embodiments of the present invention system 10 is used in microscopy, wherein scene 20 comprises a sample on a microscope slide; in some embodiments of the present invention system 10 is used for outdoor imaging, wherein scene 20 is an outdoor scene; in some embodiments of the present invention system 10 is used for aerial photography wherein scene 20 comprises an aerial view of objects; in some embodiments of the present invention system 10 is used in astronomical imaging, wherein scene 20 is an astronomical scene; and in some embodiments of the present invention system 10 is used in medical imaging wherein scene 20 is a living body or an organ thereof. Also contemplated are embodiments in which system 10 is mounted on a vehicle such as, but not limited to, an automobile, for example, for capturing a rear-view or front-view images of the scene nearby the vehicle.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

Examples

Reference is now made to the following examples, which together with the above descriptions illustrate some embodiments of the invention in a non limiting fashion.

Adiabatic frequency generation (AFG) allows efficient, robust and scalable transfer of broadband, visible and near-IR lasers to the mid-IR optical regime and vice versa. The AFG can resolve the bandwidth-efficiency trade-off in nonlinear frequency conversion, allowing to simultaneously achieve broad bandwidth conversion with good efficiency. Yet, heretofore AFG has been used to convert laser light sources with very good beam quality, but was not used for transferring spectrally broad images.

Recently, nonlinear conversion attempts of low frequency (energy) to high frequency (energy) photons, showed high quantum efficiency that can allow a single photon sensitivity. However, unlike the technique of the present embodiments these attempts are bound by the phase matching requirement making the color imaging a serial process where for each desired narrow band of wavelengths the angle or temperature of the crystal has to be separately tuned. The AFC imaging process of the present embodiments frees this approach from these constraints and leads to single shot capture color image of Mid IR information.

Figure 2A:
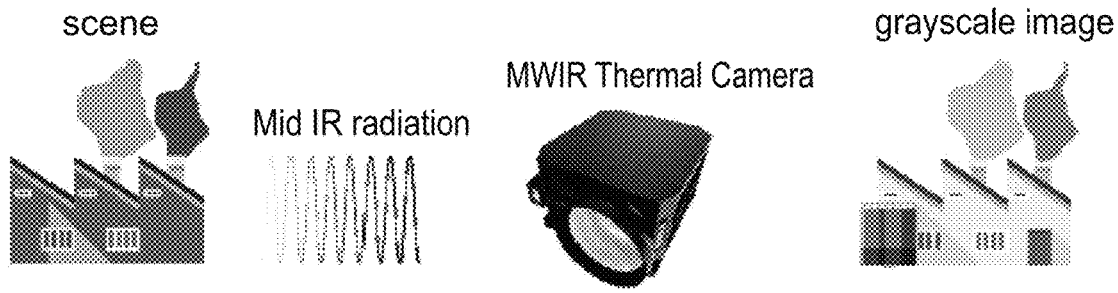
FIGS. 2A-C illustrate differences between MWIR imaging (FIG. 2A), MWIR hyperspectral imaging (FIG. 2B), and imaging by adiabatic sum frequency generation (SFG) according to some embodiments of the present invention (FIG. 2C)
Figure 2B:
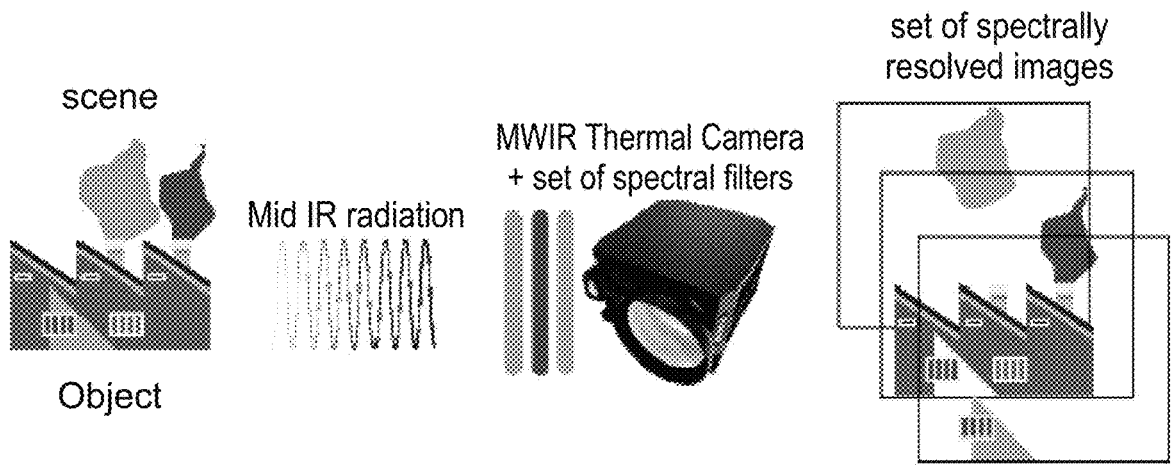
Figure 2C:
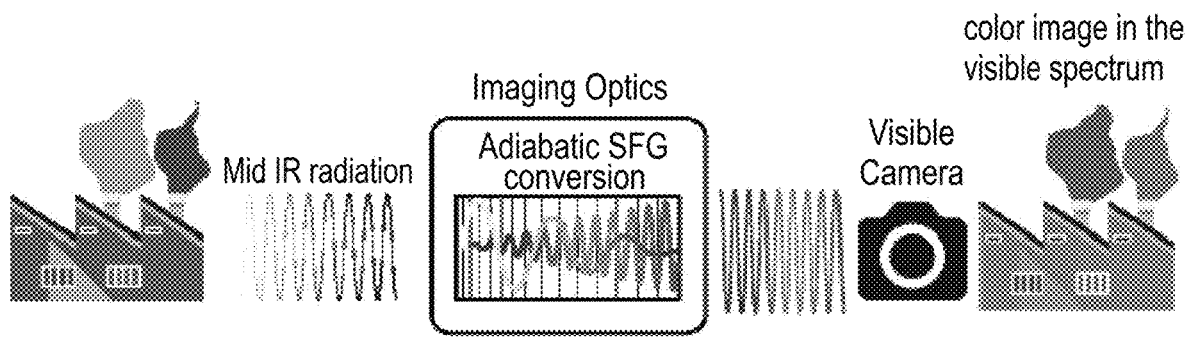

FIGS. 2A-C illustrate the differences between MWIR imaging (FIG. 2A), MWIR hyperspectral imaging (FIG. 2B), and the adiabatic sum frequency generation (SFG) of the present embodiments (FIG. 2C).

Figure 3:
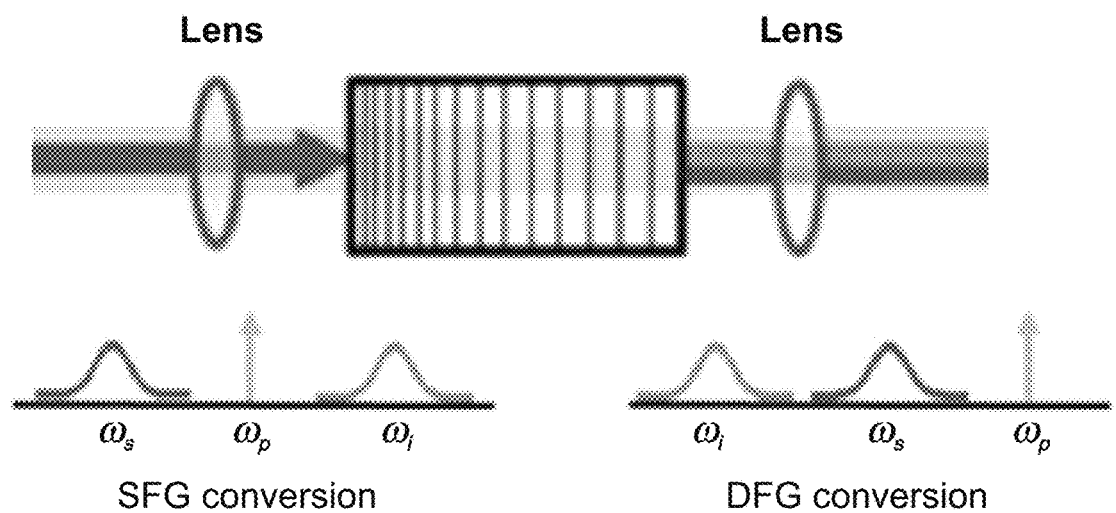
FIG. 3 is a schematic illustration of an adiabatic frequency generation process in adiabatically poled non-linear crystal, according to some embodiments of the present invention.

FIG. 3 is a schematic illustration of the AFG process in adiabatically poled non-linear crystal. AFC allows generating broadband pulses in the mid-IR wavelength regime, which outperform the currently available mid-IR ultrashort sources. Unlike other techniques the AFC allows an efficient transfer of broadband, high-energy visible and near-IR lasers to the mid-IR and vice versa. The AFC technique applies robust population transfer by rapid adiabatic passage from atomic physics to nonlinear optical frequency conversion, which effectively avoids two main hurdles of optical frequency generation: limited bandwidth and limited conversion efficiency. The process is based at least partially on the physical mechanism that the coupled system remains in one of its eigenstates during the entire evolution. One of the characteristics of the AFC technique is a conversion efficiency curve that is substantially flat for broad bandwidth, meaning there is a one-to-one mapping of the spectral amplitude and phase of the input signal into the generated new color. From the symmetry of the dynamical equations, both difference frequency generation (DFG) and the sum frequency generation (SFG) can occur. In SFG conversion, a low energy photon (signal) is mixed with a pump photon to yield a photon, idler, of energy higher than both the pump and the signal. This process for example converts VIS-NIR to mid-IR and vice versa with a pump in the NIR. In DFG conversion, the pump photon is the one with the higher energy in the whole process, creating an idler that is of lower energy than the signal. Thus, in adiabatically aperiodic crystal, flat conversion curve can reach unity for a very broadband spectrum, while for conventional phase matched nonlinear processes (where the phase-mismatch is constant), the conversion curve is very efficiency only over a narrow wavelength range.

Figure 4:
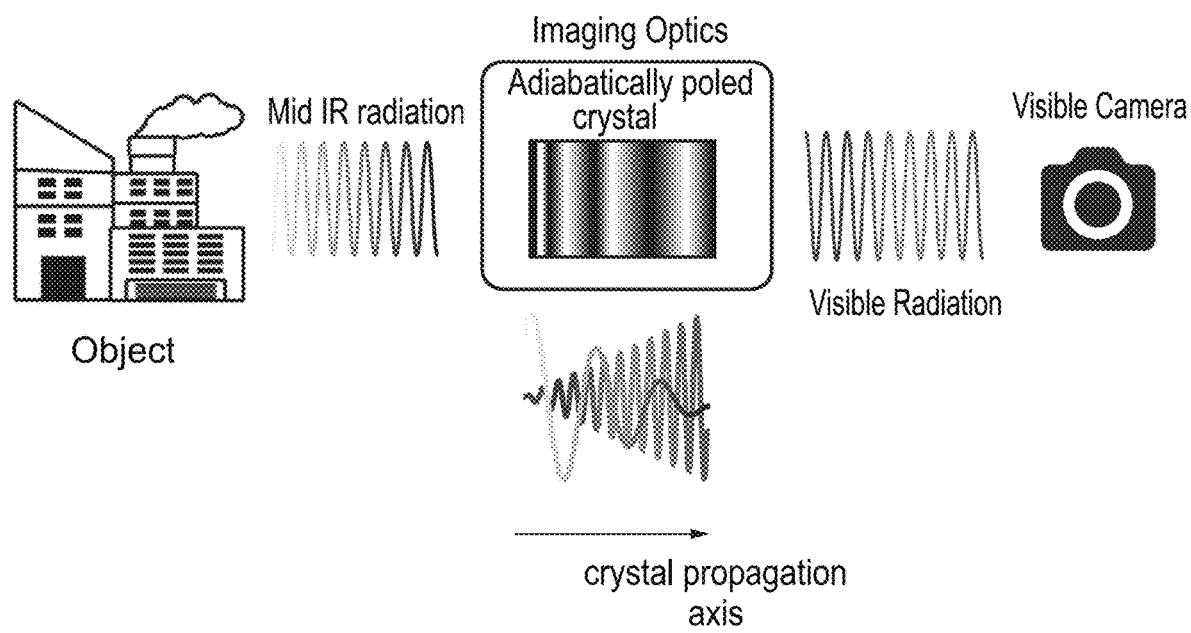
FIG. 4 is a schematic illustration explaining the concept of imaging by an adiabatically poled crystal according to some embodiments of the present invention.

The Inventors of the present invention found that amplitude and phase modulations enacted in the near-IR can be transferred to the mid-IR which can be used for shaping the temporal structure of the mid-IR pulse for coherent control and nonlinear spectroscopy applications. The inventors thus successfully combine the adiabatic concept with 2D coherent and incoherent image upconversion, and allow spectrally resolved broadband mid-IR images to be captured, for example, by a conventional silicon high resolution camera. The concept is depicted in FIG. 4. The adiabatically poled crystal converts with high efficiency, in a single shot, a broad range of mid IR frequencies contained in the object and the generated VIS-NIR frequencies are imaged onto a Silicon camera to form an image with a one to one relationship between the generated VIS-NIR wavelengths and the original mid-IR wavelengths. In FIG. 4, the mid IR beam is depicted as an oscillating grayscale wave and the VIS-NIR beam is depicted as an oscillating colored wave. The mid IR beam is gradually converted into a VIS-NIR beam as it propagates along the crystal. Thus the amplitude (hence also the intensity) of mid IR beam is gradually decreased and the amplitude (hence also the intensity) of the VIS-NIR beam is gradually increased.

Figure 5:
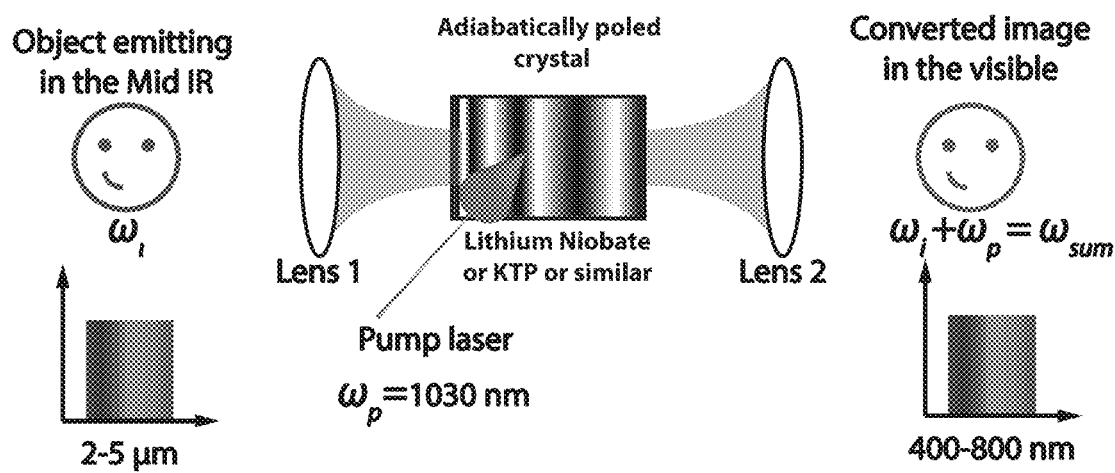
FIG. 5 is a schematic illustration explaining the imaging shown in FIG. 4 in greater detail.

FIG. 5 illustrates the spectral characteristics of the imaging technique of the present embodiments in greater detail. An object is imaged with a magnified 4-f system where the Fourier transform of the object is created using a first lens of focal length $f_1$ in the crystal. In the crystal, the spatial frequencies are encoded as angular position across the crystal facets, rendering the crystal aperture as an effective spatial frequency filter. The mid-IR radiation spanning over the range of 2-5 µm is converted by the crystal to the visible range using a pump laser at, for example, 1030 nm, that is focused on the crystal with a sufficiently long Rayleigh range, allowing efficient conversion along the crystal length. Then, the spectrally converted object Fourier transform (optionally and preferably together with some phase to the propagation in the crystal) is transformed back to the image plane with a second lens of focal length $f_2$ where a visible detector renders the object's image with a magnification of $f_2/f_1$.

The detector is optionally and preferably equipped with suitable filter to filter out the pump laser and to allow only the wavelengths originating from the image wavelengths conversion to be perceived.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

REFERENCES

[1] Singh-Rachford, T. N. Castellano, F. N. Coord. Chem. Rev. 254, 2560-2573 (2010).
[2] R. W. Boyd, C. H. Townes, Appl. Phys. Lett. 31, 440 (1977)
[3] J. S. Dam, P. Tidemand-Lichtenberg, C. Pedersen, Nature Photonics 6, 788-793 (2012)
[4] M. Razeghi, B.-M. Nguyen, "Advances in mid-infrared detection and imaging: a key issues review", Reports on Progress in Physics, 77 (2014)
[5] H. Suchowski, D. Oron, A. Arie and Y. Silberberg, "Geometrical representation of sum frequency generation and adiabatic frequency conversion", Physical Review A 78, 063821 (2008)
[6] H. Suchowski, B. D. Bruner, A. Ganany-Padowicz, I. Juwiler, A. Arie and Y. Silberberg, "Adiabatic frequency conversion of ultrafast pulses", Applied Physics B 105, 697 (2011)
[7] H. Suchowski, G. Porat, A. Arie, "Adiabatic processes in frequency conversion", Laser and Photonics Reviews 8, 333 (2014)
[8] H. Suchowski, P. R. Krogen, S. W. Huang, F. X. Kärtner, J. Moses, "Octave-spanning coherent mid-IR pulses via adiabatic difference frequency generation", Opt. Exp. 21, 28892 (2013). P. R. Krogen, H. Suchowski, S.-W. Huang, F. X. Kärtner, J. Moses, under review Nat. Phot. (2016)
[9] H. Cankaya, A. L. Calendron, H. Suchowski, F. X. Kärtner, "Highly efficient broadband sum-frequency generation in visible wavelength range", Opt. Lett. 39, 2912 (2014) A. Dahan, A. Levanon, M. Katz, H. Suchowski, "Ultrashort adiabatic sum frequency generation", under review, J. Phys.: Condens. Matter (2016)
[10] D. Wasserman, R. Singh, T. Akalin, "Special issue on mid-infrared and THz photonics" J. Opt. 16, 090201 (2014)
[11] Editorial, "Mid-infrared" Extending opportunities, Nature Photonics 6, 407 (2012)
[12] B. Stuart, "Infrared Spectroscopy: Fundamentals and Applications", Wiley (2004)
[13] D. Pile, "Mid-infrared—Femtojoule communication", Nature Photonics 9, 75 (2015)
[14] G. Steinmeyer, J. S. Skibina, "Supercontinua: Entering the mid-infrared", Nature Photonics 8, 814-815 (2014)
[15] U. Willer, M. Saraji, A. Khorsandi, P. Geiser, W. Schade, "Near- and mid-infrared laser monitoring of industrial processes, environment and security applications", Optics and Lasers in Engineering 44, 699-710 (2006)
[16] M. Vollmer, K.-P. Mollmann Wi, "Infrared Thermal Imaging: Fundamentals, Research and Applications", Wiley (2010)
[17] J. E. Midwinter, Appl. Phys. Lett. 12, 68. (1968)
[18] J. E. Midwinter, Appl. Phys. Lett. 14, 29. (1969)
[19] J. Falk, W. B. Tiffany, J. Appl. Phys. 43, 3762. (1972)
[20] R. F. Lucy, Appl. Opt. 11, 1329. (1972)
[21] J. Warner, Opt. Quantum. Electron. 3, 37 (1971)
[22] J. Warner, Appl. Phys. Lett. 13, 360 (1968)
[23] D. Stothard, M. Dunn, and C. Rae, Opt. Express 12, 947 (2004)
[24] C. Pedersen, E. Karamehmedović, J. S. Dam, P. Tidemand-Lichtenberg, Opt. Express 17, 20885 (2009)
[25] J. S. Dam, C. Pedersen, P. Tidemand-Lichtenberg, "High-resolution two-dimensional image upconversion of incoherent light" Opt. Lett. 35, 3796-3798 (2010)

What is claimed is:
1. An imaging system, comprising:
a light source generating a pump beam;
an optical coupling system configured for receiving an input beam of infrared light from a scene and combining said input beam with said pump beam, wherein an intensity of said pump beam is higher than an intensity of said input beam;

a crystal configured for adiabatically mixing said beams and providing an output beam having a frequency which is a sum of frequencies of said input and pump beams; and a visible, near-infrared or ultraviolet light imager configured for collecting and for spectrally resolving said output beam.

2. The system according to claim 1, wherein said output beam is a visible light output beam.

3. The system according to claim 1, wherein said crystal is optimized such that an extent of Kerr effect and/or two-photon absorption due to interaction of said light beams with said crystal is less than a predetermined threshold.

4. The system according to claim 1, wherein said light source is configured for generating a pulsed pump beam at a repetition rate, and the system comprises a cavity, characterized by a resonance frequency within a bandwidth of said pump beam, and having a length selected based on said repetition rate to synchronize between pulses in said pump beam.

5. The system according to claim 1, wherein said light source is configured for generating a continuous wave pump beam.

6. The system according to claim 1, wherein said crystal configured for simultaneously mixing said pump beam with each of a plurality of wavelengths of said input beam.

7. The system according to claim 6, wherein said plurality of wavelengths of said input beam spans over at least one octave.

8. The system according to claim 6, wherein said plurality of wavelengths span over at least 10% of a range of wavelengths defined from about 1.5 µm to about 20 µm.

9. The system according to claim 1, wherein said light source is configured for generating a pulsed pump beam and wherein a characteristic pulse duration of said pulsed pump beam is less than 10 ns.

10. The system according to claim 1, wherein a lateral area of said crystal is at least 5 mm by 5 mm.

11. The system according to claim 1, wherein said crystal configured for adiabatically mixing mid-infrared light with near-infrared light.

12. The system according to claim 1, comprising at least two crystals, a beam splitter system and a beam combiner system,
wherein said beam splitter system is configured to split said input beam to at least two secondary input light beams and direct each secondary input light beam to a different crystal of said at least two crystals,
wherein each crystal of said at least two crystals is configured for adiabatically mixing a respective secondary input light beam with said pump beam and providing an individual respective output beam having a frequency which is a sum of frequencies of said secondary input and pump beams; and
wherein said beam combiner system is configured to combine said individual output beams to provide said output beam.

13. A method of imaging, comprising:
receiving an input beam of infrared light from a scene;
combining said input beam with a pump beam, wherein an intensity of said pump beam is higher than an intensity of said input beam;
transmitting said beams to a crystal configured for adiabatically mixing said beams to provide a visible or near-infrared light output beam having a frequency which is a sum of frequencies of said input and pump beams; and
collecting said output beam using a visible, near-infrared or ultraviolet light imager configured for collecting and to spectrally resolving said output beam.

14. The method according to claim 13, wherein an intensity of said pump beam is selected such that an extent of Kerr effect due to interaction of said light beams with said crystal is less than a predetermined threshold.

15. The method according to claim 13, wherein an intensity of said pump beam is selected such that an extent of two-photon absorption due to interaction of said light beams with said crystal is less than a predetermined threshold.

16. The method according to claim 13, wherein said pump beam is a pulsed pump beam, and the method comprises enhancing a mixing power of said beams in said crystal using a cavity characterized by a resonance frequency within a bandwidth of said pump beam, and having a length selected based on said repetition rate to synchronize between pulses in said pump beam.

17. The method according to claim 13, wherein said input beam is a mid-infrared beam, and said pump beam is a near-infrared beam.

18. The method according to claim 13, wherein said receiving, said combining, said transmitting and said collecting are executed at a single shot without combining image information from a plurality of image acquisitions.

19. The system according to claim 1, wherein said imager comprises silicon.

20. The system according to claim 1, wherein said imager comprises a MOS circuit or a CMOS circuit.

21. The system according to claim 1, wherein said scene is selected from the group consisting of: an outdoor scene, an aerial photography scene, an astronomical scene, a living body or an organ thereof, and a scene which comprises a sample on a microscope slide.

* * * * *